United States Patent Office 3,305,570
Patented Feb. 21, 1967

3,305,570
HALOGENATION OF PENTAVALENT-PHOSPHORUS COMPOUNDS-POLYVALENT METAL HALIDE COMPLEXES WITH POLYHALOMETHANES
William E. Bacon, Kent, Ohio, assignor to The Lubrizol Corporation, Wickliffe, Ohio, a corporation of Ohio
No Drawing. Filed Oct. 8, 1963, Ser. No. 314,614
23 Claims. (Cl. 260—448)

The present invention relates to a novel method for preparing certain phosphorus- and chlorine-containing intermediates. More particularly, it relates to a halogenation process.

Compounds which contain phosphorus within their molecular structure are, in general, quite useful as additives in insecticides, lubricating oils, hydrocarbon fuels, asphalts, plastics and paints. The higher molecular weight, oil-soluble organophosphorus compounds, when added in small proportions to a lubricating oil, impart extreme pressure properties and tend to diminish the decomposition and subsequent corrosive properties of such lubricating oils. Consequently, these compounds have been used extensively throughout the broad field of lubrication. The intermediates which result from the novel process described herein are useful in the preparation of other phosphorus-containing compositions. Although other methods may be utilized for the preparation of the desired intermediates, those methods suffer from the relative unavailability of the starting materials or alternatively, produce the desired phosphorus-containing compositions in low yields.

Accordingly, it is an object of this invention to provide an efficient and low cost method for preparing organophosphorus compounds.

Another object is to provide a process for the preparation of halophosphorus compounds.

Still another object is to provide a process for the preparation of organophosphorus acids, esters, oxides, and halides.

These and other objects of the invention are achieved by a process for preparing halophosphorus comprising reacting at a temperature of from about 0° to 150° C., a mixture of (a) a phosphorus- and sulfur-containing complex having the formula

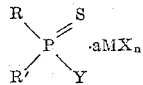

wherein X is a halogen
Y is a radical selected from the class consisting of —OH, —OR, —SH, —SR, —O—P(S)RR',
—S—S—P(S)RR', —S—P(S)RR', —X, and —R,
$a$ is a number from 1 to 2,
M is a metal selected from the class consisting of aluminum, iron, tin, and titanium,
$n$ is the valence of M, and
R and R' are hydrocarbon radicals, and (b) a polyhalomethane having at least three halogen radicals.

The hydrocarbon radicals R and R' of the phosphorus reactant (a) are radicals containing preferably from 1 to 30 carbon atoms. These radicals may also contain polar groups provided, however, that the polar groups are not present in proportions sufficiently large to alter significantly the hydrocarbon character of this radical. Generally the radicals will contain no more than two polar groups for every ten carbon atoms. Such polar groups are exemplified by the chloro, bromo, keto, ether, aldehyde, nitro, etc. groups. Additionally, the hydrocarbon radicals may be the same or different aliphatic, cycloaliphatic, and/or aromatic radicals.

Examples of the hydrocarbon aliphatic and cycloaliphatic radicals are methyl, ethyl, propyl, isobutyl, n-hexyl, cyclohexyl, chloro-ethyl, nitro propyl, chloro cyclohexyl, etc.

Examples of aromatic radicals are the organic radicals containing at least 1 resonant ring structure such as phenyl, naphthyl, anthracyl, phenanthryl, triphenylenyl, biphenyl, and terphenyl radicals, and the substitution products of these such as alkylation products, halogenation products, nitration products, etc. Examples of the alkylation products include tolyl, cresyl, xylyl, mesitylenyl, di-ethyl phenyl, isopropylphenyl, tert-butyl phenyl, paraffin wax-substituted phenyl, dodecyl phenyl, etc. Examples of the halogenation products include chlorophenyl, dichlorophenyl, bromophenyl, mono- and polychloro xenyl, mono- and poly-chloro naphthyl, ethyl chlorophenyl, etc. Examples of nitration products include nitro benzene, nitro xenyl, methyl nitrophenyl, etc. Although any of the above aromatic radicals can be utilized, organic radicals containing but one resonant ring structure are preferred.

The phosphorus- and sulfur-containing reactants useful in the process of this invention may be phosphinomonothioic acids (Y is —OH), phosphinodithioic acids (Y is —SH), the esters, anhydrides, and halides of such acids (Y is —OR, —SR, —O—P(S)RR', —S—P(S)RR', —X, respectively), and phosphinothioic disulfides (Y is —S—S—P(S)RR'), and phosphine sulfides (Y is —R).

Phosphinodithioic acids can be prepared by the reaction of Grignard reagents (e.g., butylmagnesium bromide, cyclohexyl magnesium iodide) with phosphorus pentasulfide (see Organophosphorus Compounds, G. M. Kosolapoff, p. 135, John Wiley and Sons, New York, 1950). The diaromatic phosphinodithioic acids can also be prepared by heating an aromatic compound (e.g., benzene, xylene, chlorobenzene) a phosphorus sulfide in the presence of an aluminum halide as described in U.S. Patent No. 2,797,238.

The preparation of alkyl aryl phosphinodithioic acids is illustrated by the reaction of an alkyl thionophosphine sulfide (e.g., (RPS$_2$)$_2$) with an aromatic compound in the presence of aluminum chloride as described by Newallis et al. in vol. 27, Journal of Organic Chemistry, page 3829. For example, phenylmethyl phosphinodithioic acid is easily prepared by the reaction of methyl thionophosphine sulfide with benzene in the presence of aluminum chloride.

Examples of the foregoing phosphinodithioic acids are diphenyl phosphinodithioic acid, ditolyl phosphinodithioic acids, di-(chlorophenyl) phosphinodithioic acid, phenyl tolyl phosphinodithioic acid, di-(wax phenyl) phosphinodithioic acid, phenyl isopropyl phosphinodithioic acid, phenyl methyl phosphinodithioic acid, diethyl phosphinodithioic acid, di-(n-propyl) phosphinodithioic acid, and di-dodecyl phosphinodithioic acid.

The organic phosphinomonothioic acids can be prepared by the controlled hydrolysis of the corresponding phosphinodithioic acids.

Examples of such phosphinomonothioic acids include diphenyl phosphinomonothioic acid, ditolyl phosphinomonothioic acid, di-(chlorophenyl) phosphinomonthioic acid, phenyl isopropyl phosphinomonothioic acid, diethyl phosphinomonothioic acid, and di-(-n-propyl) phosphinomonothioic acid.

The phosphinodithioic and phosphinomonothioic acid esters can be prepared by the reaction of the phosphinodithioic acid with alcohols and phenols according to the procedure described in U.S. Patent No. 2,881,200. Examples of such esters include methyl diphenylphosphinodithioate, methyl ditolylphosphinodithioate, isobutyl ditolylphosphinodithioate, phenyl diethylphosphinodithioate, octyl phenyl-methylphosphinodithioate, and cyclohexyl phenyl-methylphosphinodithioate, methyl ditolylphosphinomonothioate, methyl diethylphosphinomonothioate, octyl di-(n-propyl)phosphinomonothioate, isobutyl phenyl methylphosphinomonothioate, and phenyl ditolylphosphinomonothioate.

The anhydrides of the phosphinothioic acids are easily prepared by heating the corresponding acid at a temperature of about 170° C. for about 5 hours. The phosphinothioic sulfides (i.e., 1,4-disulfido-2,3-dithiatetraphosphoranes) which are also useful as the phosphorus- and sulfur-containing reactant in the process of this invention are prepared from the corresponding phosphinodithioic acids by heating with an aqueous solution of hydrogen peroxide.

The preparation of the phosphinothioic halides useful in the process of this invention may be accomplished either by sulfurization of the corresponding monochlorophosphine with sulfur or thiophosphoryl chloride, by a Friedel-Crafts reaction of an aromatic compound with thiophosphoryl chloride in the presence of aluminum chloride, or by the reaction of a phosphinodithioic acid with hydrogen chloride.

The tertiary phosphine sulfides which are useful in the process of this invention as reactant (a) may be prepared by the procedures described in Chapter 6 of Organophosphorus Compounds, G. M. Kosolapoff, John Wiley and Sons, New York, 1950. Suitable examples of such phosphine sulfides include triphenylphosphine sulfide, tritolylphosphine sulfide, diphenyl tolylphosphine sulfide, phenyl diethylphosphine sulfide, etc.

The metal halide complexes of (a) can be formed by the addition of from 1 to 2 moles of the metal halide per mole of the phosphorus- and sulfur-containing reagent followed by heating at 100° C. for one to two hours. The metal halides ($MX_n$) useful in the process of this invention are the aluminum, stannous, stannic, ferrous, ferric, and titanium chlorides, bromides, and iodides. Aluminum chloride is preferred for reasons of economy.

Additionally, the di-aromatic phosphinodithioic acids are generally prepared by the reaction of an aromatic compound with phosphorus pentasulfide and a metal halide. The product of this reaction is the metal halide complex of the phosphinodithioic acid which can be used as reagent (a) without further purification. The molar ratio of metal halide to phosphorus pentasulfide should not be greater than 4:1. This upper limit is predicated on the discovery that the presence of greater amounts of aluminum halide results in undesirable side reactions such as the further reaction of the complex with the aromatic compound. Thus, when an excess of metal halide is used to prepare the metal halide complex of di-aromatic phosphinodithioic acids, the acid complex is not isolated. Generally, the reactants are mixed and heated at the reflux temperature for 8 to 10 hours. Filtration and removal of the excess aromatic hydrocarbon results in isolation of the metal halide complex of the phosphinodithioic acid. The aluminum halide-phosphinodithioic acid molar ratio of these complexes can vary from 1:1 to 2:1 depending on the aluminum halide-aromatic compound ratio in the preparatory step.

The polyhalomethanes useful in the process of this invention include those polyhalomethanes having at least 3 halogen radicals. Suitable examples of such polyhalomethanes include carbon tetrachloride, carbon tetrabromide, carbon tetraiodide, chloroform, iodoform, and bromoform. Carbon tetrachloride is preferred because of its availability and low cost.

The process of this invention is carried out by mixing the reactants at a temperature of from about 0° to 150° C. Temperatures within the range of 0°–100° C. are preferred, although lower or higher temperatures may be employed in particular instances. The reaction often is exothermic and the reaction mass must be cooled if it is desired to maintain a constant temperature. A constant temperature is not essential, however, for the success of the process. The molar ratio of polyhalomethane to metal halide complex (a) should be at least 1:1 and is generally from 1:1 to 2:1. The progress of the reaction in most cases can be ascertained by the observance of carbon disulfide evolution from the reaction mass.

Although the exact mechanism by which the reaction proceeds is not known, the products of the reaction, which is a halogenation reaction, have in some instances, been identified. The nature of the particular product, a metal halide complex, is dependent upon the nature of the starting phosphorus- and sulfur-containing reactant. In most instances, sulfur radicals are replaced by halogen radicals. Thus, the reaction of carbon tetrachloride with the metal halide complexes of phosphinodithioic acids, phosphinothioic halides, phosphinothioic disulfides, and the anhydrides of phosphinodithioic acids produces the corresponding metal halide complexes of trihalophosphoranes as illustrated below in Table I (reactions I–IV).

The remaining phosphorus- and sulfur-containing complexes of (a) react with polyhalomethanes to give metal complexes of dihalophosphoranes as indicated in reactions V–IX, Table I.

TABLE I

| Reaction | Starting Material | Product |
| --- | --- | --- |
| I | $RR'PSSH \cdot aMX_n$ | $RR'PCl_3 \cdot aMX_n$ |
| II | $RR'PSX \cdot aMX_n$ | $RR'PCl_2X \cdot aMX_n$ |
| III | $[RR'P(S)S]_2 \cdot aMX_n$ | $RR'PCl_3 \cdot aMX_n$ |
| IV | $[RR'P(S)]_2S \cdot aMX_n$ | $RR'PCl_3 \cdot aMX_n$ |
| V | $RR'P(S)OH \cdot aMX_n$ | $RR'P(Cl_2)OH \cdot aMX_n$ |
| VI | $RR'PSSR \cdot aMX_n$ | $RR'P(Cl_2)SR \cdot aMX_n$ |
| VII | $RR'PSOR \cdot aMX_n$ | $RR'P(Cl_2)OR \cdot aMX_n$ |
| VIII | $[RR'P(S)]_2O \cdot aMX_n$ | $[RR'P(Cl_2)]_2O \cdot aMX_n$ |
| IX | $RR'P(S)R \cdot aMX_n$ | $RR'P(Cl_2)R \cdot aMX_n$ |

The manner of mixing of the reagents is not critical. The phosphorus- and sulfur-containing reagent (a) may be added to the polyhalomethane at the desired temperature, or carbon tetrachloride can be added to the phosphorus- and sulfur-containing compound of (a). Alternatively, the metal halide complex of (a) can be formed in situ. That is, for example, aluminum halide may be added to a solution of a phosphorodithioic acid in a polyhalomethane. In any event, the reaction proceeds through the phosphorus and sulfur reactant (a) which is a metal halide complex.

The following examples illustrate the process for preparing the halophosphorus complexes of this invention.

EXAMPLE A

A mixture of 900 parts (11.5 moles) of benzene, 320 parts (1.44 moles) of phosphorus pentasulfide, and 386 parts (2.9 moles) of aluminum chloride is heated at the reflux temperature for 8 hours and then allowed to cool to room temperature. The mixture is filtered and the excess benzene removed from the filtrate by distillation. The residue is the aluminum chloride complex of diphenylphosphinodithioic acid having an aluminum chloride to acid ratio of 1.26:1.

The above prepared phosphinodithioic acid complex (936 parts, 2.36 moles) is maintained at 60° C. and added to 726 parts (4.72 moles) of carbon tetrachloride at 30° C. The solution is then heated at the reflux temperature for 1 hour whereupon the excess carbon tetrachloride is removed by distillation at 23 mm. The residue is the aluminum chloride complex of diphenyl trichlorophosphorane having an aluminum chloride to phosphorane ratio of 1.2:1, an aluminum content of 7.55%, a chlorine content of 49.5%, and a phosphorus content of 6.8%.

EXAMPLE B

An aluminum chloride complex of diphenylphosphinodithioic acid having an aluminum chloride to acid ratio of 2:1 is prepared according to the procedure of Example A. A portion of this complex (98 parts, 0.19 mole) is added to 154 parts (1.3 moles) of chloroform which is cooled to 5° C. in an ice bath. The mixture is allowed to warm to room temperature, stirred for 1 hour at room temperature, and then heated at the reflux temperature for 2 hours. The chloroform is removed by heating to 120° C. at atmospheric pressure and finally at 100° C./ 10–15 mm. The diphenyl trichlorophosphorane-aluminum chloride complex prepared in this manner has an aluminum chloride to phosphorane ratio of 2:1.

EXAMPLE C

The aluminum chloride complex of di-(chlorophenyl) phosphinodithioic acid having an aluminum chloride to acid ratio of 1.1:1 is prepared by the procedure of Example A by reacting 890 parts (4 moles) of phosphorus pentasulfide, 2500 parts (22.3 moles) of chlorobenzene and 1170 parts (8.8 moles) of aluminum chloride. This complex (1305 parts, 2.6 moles) is added slowly over a 3 hour period to 1232 parts (12.5 moles) of carbon tetrachloride at 68°–75° C. and this temperature is maintained for 8.5 hours after the addition is complete. The excess carbon tetrachloride is removed by heating to 105° C/22 mm. The residue is the aluminum chloride complex of di-(chlorophenyl)trichlorophosphorane having a phosphorus content of 5.7%, a chlorine content of 57.9%, and an aluminum content of 6.7%.

EXAMPLE D

The aluminum chloride complex of ditolyl phosphinodithioic acid is prepared by the procedure of Example C except that the chlorobenzene is replaced, on a molar basis, by toluene.

Carbon tetrachloride (580 parts, 3.78 moles) is heated to 60° C. whereupon 728 parts (1.7 moles) of this aluminum chloride complex is added. The mixture is heated at 80° C. for 1 hour and the excess carbon tetrachloride is removed by distillation. The residue is the desired product, the aluminum chloride complex of ditolyl trichlorophosphorane.

EXAMPLE E

A mixture of 103 parts (0.4 mole) of diphenylphosphinodithioic acid and 78 parts (0.48 mole) of ferric chloride is prepared and carbon tetrachloride is added slowly at room temperature. The mixture is then heated to 45° C. whereupon carbon disulfide is removed. The temperature is maintained between 45°–65° C. for 1 hour, and is then raised to 80°–120° C. and maintained at that temperature for 2 hours to remove carbon disulfide and carbon tetrachloride. The residue is heated to 200° C. to remove any remaining carbon tetrachloride. The residue is the desired trichlorophosphorane complex having a chlorine content of 34.5% and an iron content of 14.01%.

EXAMPLE F

The procedure of Example E is repeated except that 125 parts (0.48 mole) of stannic chloride is used in lieu of the ferric chloride. The product of this reaction has a chlorine content of 37.5% and a tin content of 22.2%.

EXAMPLE G

A mixture of 91 parts (0.48 mole) of titanium tetrachloride and 250 parts of carbon tetrachloride is prepared and added to 103 parts (0.4 mole) of diphenylphosphinodithioic acid while maintaining an atmosphere of nitrogen. The mixture is heated rapidly to 80° C. and then to 120° C. Additional carbon tetrachloride (87 parts) is added and the temperature maintained at 80° C. for 2 hours before the carbon tetrachloride is removed by heating to 140° C. The residue is the desired trichlorophosphorane complex having a chlorine content of 36.1% and a titanium content of 10.2%.

EXAMPLE H

Methyl diphenylphosphinomonothioate is prepared by adding 250 parts (1 mole) phosphinothioyl chloride to a mixture of 64 parts (2 moles) of methanol, 300 parts of benzene, and 54 parts (1 mole) of sodium methoxide over a period of 1 hour at ambient temperature. The solution is then heated for 1 hour at 75° C., cooled to room temperature, washed with a 10% aqueous solution of sodium bicarbonate, and finally with water. The benzene is removed by heating at 100° C./15–20 mm. The residue is the desired methyl thioate having a phosphorus content of 12.8% and a sulfur content of 13.9%.

A mixture of 83 parts (0.3 mole) of the above prepared methyl thioate and 53 parts (0.4 mole) of aluminum chloride is prepared and 468 parts of carbon tetrachloride is added at room temperature. The solution is then heated at 75° C. for 12 hours whereupon the low boiling materials and carbon tetrachloride are removed. The residue is subjected to distillation at 105° C./34 mm. to give the desired aluminum chloride complex of diphenyl dichloro methoxyphosphorane having a chlorine content of 40.8%, an aluminum content of 9.63%, and a phosphorus content of 7.0%.

EXAMPLE I

A mixture of 250 parts (1 mole of diphenylphosphinodithioic acid and 350 parts of petroleum naphtha is prepared and a mixture of 49 parts (by volume) of a 30% aqueous solution of hydrogen peroxide and 425 parts (by volume) of water is added over a period of 40 minutes at room temperature. The mixture is then heated at 60° C. for 1 hour, filtered and the residue dried. The solid is dissolved in benzene, washed with a 10% aqueous solution of sodium bicarbonate, and then with water. The benzene is removed by distillation leaving a solid residue which is crystallized by the addition of petroleum ether. The 1,1,4,4 - tetraphenyl-1,4-disulfido-2,3-dithiatetraphosphane prepared in this manner has a melting point of 133–136° C., a sulfur content of 26.1%, and a phosphorus content of 12.6%.

Carbon tetrachloride (525 parts, 3.4 moles is added to a mixture of 92 parts (0.2 mole) of the above prepared dithiatetraphosphane and 60 parts (0.46 mole) of aluminum chloride. The solution is heated at 76°–78° C. for 12 hours during which time low boiling material and carbon tetrachloride are removed. At the end of this period, a vacuum of 27 mm. is applied while maintaining the temperature at 75° C. The residue is the aluminum chloride complex of diphenyl trichlorophosphorane having a chlorine content of 42.5%, a phosphorus content of 6.75%, and an aluminum content of 7.45%.

EXAMPLE J

A mixture of 251 parts (1 mole) of diphenylphosphinothioic chloride, 85 parts (2.1 moles) of sodium hydroxide and 300 parts of water is prepared and heated to 80° C. whereupon the reaction is violently exothermic. The mixture is stirred an additional hour without heating and poured into an ice water-hydrochloric acid mixture to precipitate the product. The desired product, diphenylphosphinomonothioic acid, is isolated by filtration and is found to have a phosphorus content of 12.9%, a sulfur content of 14.2% and a melting point range of 139°–140° C.

Aluminum chloride (65 parts, 0.48 mole) is added to a mixture of 94 parts (0.4 mole) of the above prepared phosphinomonothioic acid and 500 parts of carbon tetrachloride at ambient temperature for 1 hour. The solution is heated to 75°–78° C. and maintained at this temperature for 16 hours while removing some of the low boiling material. At the end of this time, the temperature is raised to 125° C./28 mm. to remove the remaining low boiling material. The residue is the aluminum chloride complex of diphenyl dichloro hydroxyphosphorane having an aluminum content of 8.61%, a chlorine content of 38.6%, and a phosphorus content of 7.33%.

EXAMPLE K

Aluminum chloride (65 parts, 0.48 mole) is added to a mixture of 90 parts (0.2 mole) of the anhydride of diphenylphosphinomonothioic acid and 500 parts of carbon tetrachloride at room temperature. The solution darkens and is stirred for 1.5 hours during which time the temperature reaches 35° C. The solution is then heated at 75° C. for 20 hours and finally at 110° C./21 mm. The residue is the desired dichlorophorane complex having an aluminum content of 8.67%, a chlorine content of 44.8%, and a phosphorus content of 6.98%.

EXAMPLE L

Aluminum chloride (64 parts, 0.48 mole) is added to a mixture of 92 parts (0.2 mole) of the anhydride of diphenylphosphinodithioic acid and 450 parts (2.85 mole) of carbon tetrachloride at room temperature. The solution is stirred for one-half hour and then heated to 68° C. and finally at 74° C. for a period of 10 hours. The carbon tetrachloride and carbon disulfide are collected by raising the temperature to 98.5° C. and a vacuum of 29 mm. is applied. After heating to 115° C., the solution is cooled to room temperature. The residue is the aluminum chloride complex of diphenyl trichlorophosphorane having an aluminum chloride to phosphorane ratio to 1.2:1, a chlorine content of 49%, an aluminum content of 7.95%, and a phosphorus content of 6.65%.

EXAMPLE M

A solution of 80 parts (0.3 mole) of octyl diphenylphosphinodithioate (prepared by the reaction of 1-octanol with diphenylphosphinodithioic acid at 180° C.) in 500 parts (3.1 mole) of carbon tetrachloride is added slowly to 48 parts (0.36 mole) of aluminum chloride and the mixture is stirred for 20 minutes. The solution is then heated to 80° C. and maintained at this temperature for 12 hours. At the end of this time the temperature is raised to 105° C. to remove the carbon tetrachloride and carbon disulfide formed during the reaction. The final traces of lower boiling material are removed by heating at 119° C./41 mm. for 1 hour. The residue is the desired aluminum chloride complex of diphenyl dichloro octyloxyphosphorane having an aluminum content of 7.45%, a chlorine content of 35.2%, a phosphorus content of 5.02%, and a sulfur content of 4.72%.

EXAMPLE N

Aluminum chloride (160 parts) is added slowly at room temperature to a mixture of 252 parts (1.0 mole) of diphenylphosphinothioic chloride and 462 parts (4 moles) of carbon tetrachloride and the reaction mixture reaches a temperature of 52° C. after one-half hour. The mixture is then heated to 76° C. and maintained at this temperature for 14.5 hours. The low boiling materials are then removed by heating to 138° C./27 mm. The residue is the desired diphenyl trichlorophosphorane-aluminum chloride complex having an aluminum content of 7.38%, a chlorine content of 49.8%, and a phosphorus content of 6.87%.

EXAMPLE O

A mixture of 306 parts (2.0 moles) of carbon tetrachloride and 74 parts (0.25 mole) of triphenylphosphine sulfide is prepared whereupon 40 parts (0.3 mole) of aluminum chloride is added at 24° C. The mixture becomes deep red in color and the temperature of the mixture reaches 47° C. The mixture is then heated to 78° C. and maintained at this temperature for 17 hours whereupon the temperature is raised to 49° C./24 mm. to remove the low boiling materials. The residue is the desired triphenyl dichlorophosphorane-aluminum chloride complex having a phosphorus content of 6.06%, a chlorine content of 27.5%, and an aluminum content of 6.5%.

EXAMPLE P

The aluminum bromide complex of diphenyl tribromophosphorane is prepared according to the procedure of Example E except that aluminum bromide and carbon tetrabromide are used in lieu of the ferric chloride and carbon tetrachloride.

EXAMPLE Q

An aluminum bromide complex of diethylphosphinodithioic acid having an aluminum bromide to acid ratio of 2:1 is prepared by heating a mixture of 2 moles of aluminum bromide with 173 parts (1.0 mole) of diethylphosphinodithioic acid at 100° C. This complex is then reacted with bromoform according to the procedure of Example B to produce the aluminum bromide complex of diethyl tribromophosphorane.

EXAMPLE R

To 363 parts (1.0 mole) of an aluminum chloride complex of phenylisopropyl-phosphinodithioic acid having an aluminum chloride to acid ratio of 1.1:1, there is added 664 parts of carbon tetrabromide and the solution is heated at the reflux temperature for 1 hour whereupon the excess carbon tetrabromide and other low boiling materials are removed. The final traces of low boiling material are removed by heating at 100° C./25 mm. The residue is the desired tribromophosphorane complex.

EXAMPLE S

The procedure of Example H is repeated except that equivalent amounts of methyl phenylmethylphosphinodithioate and iodoform are used in lieu of the methyl diphenylphosphinomonothioate and carbon tetrachloride.

EXAMPLE T

The procedure of Example R is repeated except that the aluminum chloride is replaced on a molar basis by titanium tetrabromide.

EXAMPLE U

The procedure of Example O is repeated except that the triphenylphosphine sulfide is replaced, on an equivalent basis, with phenyl di-(chlorophenyl) phosphine sulfide.

The halophosphorus complexes of this invention are useful as insecticides. For example, an insecticidal composition comprising an aqueous emulsion of 95 parts (by weight) of water, 4 parts of kerosene, 1 part of the aluminum chloride complex of diphenyl trichlorophosphorane, and 0.2 part of sodium dodecylbenzene sulfonate (emulsifier), is useful as a spray and is effective to control the infestation of insects on vegetation.

The halophosphorus complexes of this invention are also useful as intermediates in the preparation of phosphorus acids, esters, halides, and oxides. The process of this invention provides a convenient method for converting phosphorus- and sulfur-containing compositions into phosphorus- and oxygen-containing compounds. For example, the reaction of the products of Reaction I through VIII with water (in the presence of acids) produces the corresponding phosphinic acids while the reaction with alcohols and phenols produces the corresponding esters. Any of the methods known in the art may be utilized for hydrolysis and esterification reactions. Thus, diphenylphosphinic acid is easily prepared by hydrolyzing diphenyl dichloro octyloxyphosphorane prepared as in Example M, and diethylphosphinic acid is prepared by the hydrolysis of diethyl tribromophosphorane.

The following examples (1 through 7) illustrate further the proces for preparing the phosphinic acids and esters of this invention.

Example 1

To an ice-water mixture there is added slowly and with stirring 185 grams (0.44 mole) of the aluminum chloride complex of diphenyl trichlorophosphorane (Example A). The solid powder which precipitates is removed by filtration and then heated at 110° C. with concentrated hydrochloric acid (400 ml.) for 14 hours. The solution is filtered and the solids are washed with water, dissolved in a 10% aqueous solution of sodium carbonate, filtered to remove any solids, and the filtrate is acidified to yield diphenylphosphinic acid. The solid product is recrystallized from ethanol to yield white crystals having a melting point of 190°–193° C. with a phosphorus content of 14.1% and an acid number of 256.

Example 2

To 200 grams (0.46 mole) of the aluminum chloride complex of diphenyl trichlorophosphorane prepared in Example A at 50° C. there is added 70 grams (0.92 mole) of isobutyl alcohol. After approximately 10% of the alcohol is added the mixture is cooled to 20°–30° C. and the remainder of the alcohol added over a period of 1 hour. The product is then stirred at room temperature for 4 hours and poured into a 10% aqueous solution of hydrochloric acid. The product is extracted with benzene, dried with magnesium sulfate, filtered, and the benzene removed by heating the filtrate to 100° C./10–15 mm. The residue is isobutyl diphenylphosphinate and is found to have a phosphorus content of 11.0%.

Example 3

A mixture of 153 grams (0.3 mole) of the aluminum chloride complex of the di-(chlorophenyl) trichlorophosphorane of Example C and 300 grams of methylene chloride is cooled to 3° C., and a mixture of 38.8 grams (1.2 moles) of methanol and 30 grams of methylene chloride is added over a 3 hour period. The temperature is maintained between 5°–10° C. during the addition and the mixture is then allowed to warm to room temperature. The methylene chloride is removed by distillation and the residue poured into ice water. The product is extracted with petroleum ether, dried with magnesium sulfate, and recovered by distillation of petroleum ether at 19 mm. The residue is recrystallized from diethyl ether and ethanol to give methyl di-(chlorophenyl) phosphinate having the following analysis: phosphorus, 9.9%; chlorine, 23.1%; acid number, 189.

Example 4

Melted phenol (81 grams, 0.86 mole), is slowly added to 200 grams (0.43 mole) of the product of Example D at such a rate that the temperature is maintained between 45°–55° C. Upon completion of the phenol addition the temperature is maintained for 1 hour and the solution poured into 500 ml. of ice-water. The product is extracted with benzene, dried over magnesium sulfate, and the benzene removed by distillation. The residue is pheny ditolylphosphinate and is found to have a phosphorus content of 8.6% and a saponification number of 176.

Example 5

The aluminum chloride complex of Example L is added slowly to a water-ice mixture with stirring. A thick oil is formed which subsequently solidifies. The solid material is removed by filtration, dried, and heated with a 36% hydrochloric acid solution for 12 hours at 108° C. The solid is then separated by filtration, washed with water, dissolved in a 10% aqueous sodium carbonate solution and filtered to remove the insoluble material. The product is precipitated by the addition of 36% aqueous hydrochloric acid. The diphenylphosphinic acid prepared in this manner has a phosphorus content of 14.3% and an acid number of 250.

Example 6

The procedure of Example 5 is repeated on the product of Example J (the aluminum chloride complex of diphenyl dichloro hydroxyphosphorane) to give diphenylphosphinic acid having a phosphorus content of 14.0% and an acid number of 255.

Example 7

Phenyl isopropylphosphinic acid is prepared by the hydrolysis of the product of Example R according to the procedure of Example 5.

The reduction of the dihydrocarbon trihalophosphorane-metal halide complexes of this invention provides a convenient method for the preparation of phosphinous halides. Thus, the reaction of the trihalophosphoranes prepared by the process illustrated in reactions I through IV (Table I) with a mixture of potassium chloride and a reducing agent selected from the class consisting of aluminum and carbon results in the formation of phosphinous halides. The reduction is generally accomplished by heating the mixture of trihalophosphorane complex, potassium chloride, and the reducing agent at a temperature from about 75° to 200° C. for about two to five hours followed by distillation of the desired phosphinous halide. The molar ratio of trihalophosphorane complex to potassium chloride is generally in the range from about 1:1 to 1:2 and the ratio of potassium chloride to reducing agent is generally from about 3:1 to 1:1. The potassium chloride is used to tie-up the metal halide so that the phosphinous chloride can be distilled directly from the reaction mixture. Although the phosphinous halides can be prepared by other methods, the process of this invention provides a method of preparing pure materials with little difficulty.

The following examples (8 through 11) illustrate the process for preparing the phosphinous halides of this invention.

Example 8

The product of Example A (231 parts, 0.51 mole) is heated to 90°–100° C. with stirring and 26 parts of a mixture of 62.5 parts of potassium chloride and 7.3 parts of aluminum powder is added. This mixture is heated to 115°–120° C. whereupon the exothermic nature of the reaction causes the temperature to reach 185° C. The mixture is cooled to 115° C. and another 20 parts of the aluminum powder-potassium chloride mixture is added whereupon the temperature of the mixture reaches 185° C. without external heating. The final addition of the aluminum powder-potassium chloride mixture (23.5 parts) is added after the temperature decreases to 110° C. The exothermic nature of the reaction again causes the reaction temperature to reach 195° C. After cooling to 140° C., the product is distilled by heating to a temperature of 390° C./0.5 mm. The diphenyl phosphinous chloride prepared in this manner has a phosphorus content of 13.8% and a chlorine content of 16.5%.

Example 9

The product of Example A (231 parts, 0.51 mole) is heated to 120° C. whereupon 15.5 parts of a mixture of 62.5 parts of potassium chloride and 5 parts of carbon is added. The mixture is heated to 140° C., cooled to 120° C., and 16.5 grams of the potassium chloride-carbon mixture is added. The reaction mixture is heated to 150° C. for 1 hour and the remainder of the potassium chloride-carbon mixture added. After heating the mixture to 205° C., a vacuum of 0.75 mm. is applied and the product is distilled over a boiling point range of 70°–80° C. The distillate, diphenyl phosphinous chloride is found to have a phosphorus content of 14.8% and a chlorine content of 24.8%.

Example 10

Diphenyl phosphinous chloride is prepared according to the procedure of Example 8 except that the product of Example A is replaced on a molar basis by the product of Example N.

*Example 11*

The procedure of Example 8 is repeated except that the product of Example A is replaced on a molar basis by the product of Example P.

As mentioned previously, the reaction of the metal halide complexes of phosphine sulfides with a polyhalomethane results in the formation of a dihalophosphorane complex (Reaction IX). Hydrolysis of this reactive dihalophosphorus intermediate provides a convenient method for the preparation of the corresponding phosphine oxides. The hydrolysis can be effected by any of the methods known to the art. For example, diethyl phosphine oxide is easily prepared by the hydrolysis of the metal halide complex of diethyl phenyl dichlorophosphorane.

The following examples (12, 13) specifically illustrate the process of preparing phosphine oxides by the process of this invention.

*Example 12*

A solution of 116 parts (0.25 mole) of the product of Example O in 175 parts of benzene is added slowly to a water and ice mixture whereupon an exothermic reaction ensues. The aqueous layer is removed and the benzene solution is washed with water and dried over magnesium sulfate for 6 hours. After removal of the benzene, the brown solid residue is dissolved in a minimum amount of ethanol and water is added while hot. The solution is cooled and the precipitate is removed and discarded. Further addition of water yields the desired product having a phosphorous content of 11.0%.

*Example 13*

The procedure of Example 12 is repeated except that the product of Example O is replaced on a molar basis by the product of Example V.

The phosphorus acids, esters, halides, and oxides prepared by the process of this invention are well known and are employed as improving agents in lubricating oils and greases, particularly as additives for use in improved lubricants intended for use in crankcases of internal combustion engines, jet aviation engines, steam cylinders, steam locomotives, gas engines, and hydraulic compressor, turbine, spindle, and torque convertor mechanisms. Other suitable uses are in asphalt emulsions, insecticidal compositions, fire proofing and stabilizing agents in plastics, paint driers, cutting oils, metal drawing compositions, flushing oils, emulsifying agents, penetrating agents, gum solvent compositions, and improving agents for hydrocarbon fuels.

What is claimed is:
1. A process for preparing halophosphorus compositions comprising reacting at a temperature of from about 0° to 150° C., a mixture of
   (a) a phosphorus- and sulfur-containing complex having the formula

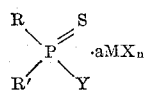

wherein X is a halogen,
   Y is a radical selected from the class consisting of —OH, —OR, —SH, —SR, —O—P(S)RR', —S—S—P(S)RR', —S—P(S)RR', —X, and —R,
   a is a number from 1 to 2,
   M is a metal selected from the class consisting of aluminum, iron, tin, and titanium,
   n is the valence of M, and
   R and R' are hydrocarbon radicals, and
   (b) a polyhalomethane having at least three halogen radicals.

2. The process of claim 1 characterized further in that Y is an —SH radical.
3. The process of claim 1 characterized further in that M is aluminum.
4. The process of claim 1 characterized further in that the polyhalomethane is carbon tetrachloride.
5. The process of claim 1 characterized further in that the halo-phosphorus composition is reacted further with a hydroxy compound selected from the class consisting of phenols, alcohols, and water.
6. The process of claim 5 characterized further in that the hydroxy compound is water.
7. The process of claim 5 characterized further in that the hydroxy compound is an alcohol.
8. A process for preparing trihalophosphoranes comprising reacting at a temperature of from about 0° to 150° C., a mixture of
   (a) a phosphorus- and sulfur-containing complex having the formula

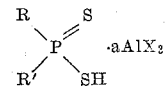

wherein X is a halogen,
   a is a number from 1 to 2, and
   R and R' are hydrocarbon radicals, and
   (b) a polyhalomethane having at least three halogen radicals.

9. A process for preparing organophosphorus halides comprising the steps of preparing a trihalophosphorane intermediate by heating at a temperature of from about 0° to 150° C., a mixture of
   (a) a phosphorus- and sulfur-containing complex having the formula

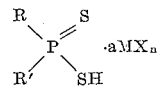

wherein X is a halogen,
   a is a number from 1 to 2,
   M is a metal selected from the class consisting of aluminum, iron, tin, and antimony,
   n is the valence of M, and
   R and R' are hydrocarbon radicals, and
   (b) a polyhalomethane having at least three halogen radicals, and reacting said trihalophosphorane intermediate at a temperature of from about 75° to 200° C. with potassium chloride and a reducing agent wherein the reducing agent is selected from the class consisting of aluminum and carbon.

10. The process of claim 9 characterized further in that M is aluminum.
11. The process of claim 9 characterized further in that the polyhalomethane is carbon tetrachloride.
12. A process for preparing organophosphorus oxides comprising the steps of preparing a dihalophosphorus intermediate by heating at a temperature of from about 0° to 150° C., a mixture of
    (a) an organophosphorus sulfide having the formula

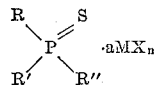

wherein X is a halogen,
    M is a metal selected from the class consisting of aluminum, iron, tin, and antimony,
    a is a number from 1 to 2,
    n is the valence of M, and
    R, R', and R'' are hydrocarbon radicals, with
    (b) a polyhalomethane having at least three halogen radicals, and then reacting said dihalophosphorus intermediate with water at a temperature of from about 25° to 200° C.

13. The process of claim 12 characterized further in that M is aluminum.

14. The process of claim 12 characterized further in that R, R' and R" are aromatic radicals.

15. The process of claim 12 characterized further in that the polyhalomethane is carbon tetrachloride.

16. The process for preparing the aluminum chloride complex of diphenyl trichlorophosphorane comprising the reaction at a temperature of from 0° to 100° C., a mixture of
  (a) the aluminum chloride complex of diphenylphosphinodithioic acid having an aluminum chloride to acid ratio of from 1:1 to 2:1 with
  (b) carbon tetrachloride.

17. The process of claim 16 characterized further in that the diphenyl trichlorophosphorane is reacted further with water to form diphenylphosphinic acid.

18. The process of claim 16 characterized further in that the diphenyl trichlorophosphorane-aluminum chloride complex is reacted further with iso-butyl alcohol to form iso-butyl diphenylphosphinate.

19. The process for preparing diphenyl phosphinous chloride comprising the steps of preparing the aluminum chloride complex of diphenyl trichlorophosphorane by heating at a temperature of from about 0° to 100° C.,
  (a) the aluminum chloride complex of diphenyl phosphinodithioic acid having an aluminum chloride to acid ratio of from 1:1 to 2:1, and
  (b) carbon tetrachloride,
reacting said diphenyl trichlorophosphorane-aluminum chloride complex with a mixture of potassium chloride and aluminum metal at a temperature of from about 75° to 200° C.

20. The process for preparing triphenylphosphine oxide comprising the steps of preparing the aluminum chloride complex of triphenyl dichlorophosphorane by heating at a temperature of from about 0° to 100° C., a mixture of
  (a) the aluminum chloride complex of triphenylphosphine sulfide having an aluminum chloride to sulfide ratio of from 1:1 to 2:1, and
  (b) carbon tetrachloride, and
then reacting said triphenyl dichlorophosphorane-aluminum chloride complex at a temperature of from about 25° to 200° C. with water.

21. The process for preparing diphenylphosphinic acid comprising the steps of preparing the aluminum chloride complex of diphenyl dichloro hydroxyphosphorane by heating at a temperature of from about 0° to 100° C., a mixture of
  (a) the aluminum chloride complex of diphenylphosphinomonothioic acid having an aluminum chloride to acid ratio of from 1:1 to 2:1, and
  (b) carbon tetrachloride, and
reacting said diphenyl dichloro hydroxyphosphorane-aluminum chloride complex with water at a temperature of from about 0° to 100° C.

22. The process of preparing di-(chlorophenyl)phosphinous chloride comprising the steps of preparing the aluminum chloride complex of di-(chlorophenyl) trichlorophosphorane by heating at a temperature of from 0° to 100° C.,
  (a) the aluminum chloride complex of the anhydride of di-(chlorophenyl)phosphinodithioic acid having an aluminum chloride to anhydride ratio of from 1:1 to 2:1, and
  (b) carbon tetrachloride, and
reacting said di-(chlorophenyl)trichlorophosphorane-aluminum chloride complex with a mixture of potassium chloride and aluminum metal at a temperature from about 75°–200° C.

23. The process for preparing diphenylphosphinous chloride comprising the steps of preparing the aluminum chloride complex of diphenyl trichlorophosphorane by heating at a temperature from about 0°–100° C.,
  (a) the aluminum chloride complex of diphenylphosphinous chloride having an aluminum chloride to phosphinous chloride ratio of from 1:1 to 2:1, and
  (b) carbon tetrachloride, and
reacting said diphenyl trichlorophosphorane-aluminum chloride complex with a mixture of potassium chloride and aluminum metal at a temperature of from about 75°–200° C.

No references cited.

HELEN M. McCARTHY, *Primary Examiner.*

W. F. W. BELLAMY, *Assistant Examiner.*